United States Patent [19]
Bieck et al.

[11] Patent Number: 5,667,120
[45] Date of Patent: Sep. 16, 1997

[54] DEVICE FOR THE VARIABLE DIVISION OF A MOTOR VEHICLE BOOT AND FOR SECURING THE LOADED CARGO

[75] Inventors: Torsten Bieck, Waldachtal; Manfred Haage, Dornstetten; Herbert Erath, Waldachtal; Bernd Plocher, Rottenburg-Seebronn, all of Germany

[73] Assignee: fischerwerke, Artur Fisch GmbH & CO KG, Waldachtal, Germany

[21] Appl. No.: 648,409

[22] Filed: May 15, 1996

[30] Foreign Application Priority Data

May 19, 1995 [DE] Germany ............... 195 18 432.7

[51] Int. Cl.$^6$ ............... B60R 7/00; B60R 9/00; B60R 11/00
[52] U.S. Cl. ............... 224/542; 224/495; 224/498; 224/501; 224/502; 224/505
[58] Field of Search ............... 224/310, 311, 224/403, 495, 498, 501, 502, 505, 542, 925; 211/12, 175, 184; 410/120, 129, 130, 133, 155

[56] References Cited

U.S. PATENT DOCUMENTS

| | | | |
|---|---|---|---|
| 1,499,229 | 6/1924 | Laffey | 410/129 |
| 3,712,663 | 1/1973 | Laven | 410/133 |
| 5,161,700 | 11/1992 | Stannis et al. | 224/311 |
| 5,392,872 | 2/1995 | Caruso et al. | 224/42.034 |

FOREIGN PATENT DOCUMENTS

| | | |
|---|---|---|
| 0 534 374 AL | 9/1992 | European Pat. Off. |
| 27 01 786 | 7/1978 | Germany. |
| 39 00 112 A1 | 7/1990 | Germany. |
| 40 15556 AL | 11/1990 | Germany. |
| 42 34 812 AL | 4/1994 | Germany. |
| 2 267 876 A | 12/1993 | United Kingdom. |
| 2 277 723 A | 11/1994 | United Kingdom. |

*Primary Examiner*—Henry J. Recla
*Assistant Examiner*—Timothy L. Maust
*Attorney, Agent, or Firm*—Michael J. Striker

[57] ABSTRACT

A device for a variable division of a motor vehicle boot and for securing a loaded cargo, the device comprises two guide rails arrangeable at a distance apart on a boot floor, at least one supporting panel arranged between the guide rails and displaceable at right angles to the guide rails, rolling devices by which the at least one supporting panel is displaceable to the guide rails and which are arranged in both the guide rails and joined to one another, a sliding block which guides the rolling devices in one of the guide rails, the support panel being rotatably mounted on the sliding guide block and being pivotable from a horizontal position lying on the boot floor into a supportable upright position.

9 Claims, 3 Drawing Sheets

DEVICE FOR THE VARIABLE DIVISION OF A MOTOR VEHICLE BOOT AND FOR SECURING THE LOADED CARGO

BACKGROUND OF THE INVENTION

The invention relates to a device for the variable division of a motor vehicle boot and for securing the loaded cargo using guide rails arranged on the boot floor and pivotable supporting panels.

Depending on the use to which the motor vehicle is put, the cargo to be carried in the boot varies widely in respect of the number of individual items and their shapes and sizes. In particular in everyday use, often only relatively small items, such as shopping bags, briefcases etc. are carried in the boot, and take up only part of the boot space. Unsecured cargo of this kind tends to slide around or even tip over in the boot as the vehicle is accelerated when moving off, braked, or driven round bends, which, if the cargo being transported is heavy or fragile, can easily lead to damage to the cargo or even to the motor vehicle.

So-called "non-slip mats" are commercially available, which are placed on the floor of the boot and are intended to prevent the cargo being displaced during travel. Such non-slip mats are effective only for cargo of certain shapes, sizes and weights, however, and only at relatively low acceleration values. Even with these non-slip mats, the cargo cannot be prevented from tipping over.

Boot inserts are also commercially available, with which the boot can be divided fixedly or variably. These inserts essentially comprise a frame or a fixed base plate, which can be placed on the floor of the boot or secured thereto, and on which divisions, such as dividing walls, wire brackets or similar constructions are arranged. These inserts either form fixed divisions, and are therefore suitable only for needs that always remain the same, such as exist, for example, in the professional field, or allow only a limited number of variations for dividing the space. Since a division of the boot according to individual requirements is therefore not possible or only possible with considerable effort, these known boot inserts are unsuitable for everyday use.

When not in use, these inserts take up a relatively large amount of space, even when they are constructed partially to collapse or fold away, and therefore have to be taken out of the boot every time a larger space is required. Access to the spare wheel, which is usually housed in the floor of the boot, is frequently also obstructed by such inserts, so that when changing a wheel first of all the insert has to be taken out of the boot.

SUMMARY OF THE INVENTION

Accordingly, it is an object of the present invention to provide a device for the variable division of a motor vehicle boot and for securing the loaded cargo, which avoids the disadvantages of the prior art.

More particularly, it is an object of the present invention to provide a device for the variable division of a motor vehicle boot and for securing the loaded cargo, which device can be adapted quickly and steplessly to the particular requirements, and when not in use takes up minimum space in the boot.

The device according to the invention comprises two guide rails arranged a distance apart on the boot floor, and at least one support panel arranged between the guide rails, which support panel is displaceable at right angles to the guide rails by means of rolling devices which are arranged in both guide rails and are joined to one another and by means of a sliding guide block guided in one guide rail. The rolling devices joined to one another by way of an axle so that they rotate together and guided in both guide rails enable the support panel to be displaced without skewing irrespective of the point of application of the pushing force. The rolling devices can be formed by roller wheels running in the guide rails or, in a preferred embodiment, by two toothed wheels joined to one another by means of an axle so that they rotate together, each toothed wheel engaging in a series of teeth of a profiled rack member which is inserted in each of the guide rails. By way of the toothed wheels and their engagement in a profiled rack member, both toothed wheels are moved uniformly, thus allowing a slip-free displacement of the support panels, excluding any skewing, between the two guide rails.

The axle of the rolling device is mounted on the one side on the sliding guide block, which in its turn is joined to the support panel by means of a swivel bearing. On the other side, the axle is mounted in the end face of the support panel. By means of the sliding guide block guided in one of the two guide rails the support panel is aligned at right angles to the guide rail. Further, the support panel is pivotally mounted on the sliding guide block in order to be brought into a position lying on the boot floor and also into an upright position. In the upright position, the support panel can be supported by means of a locking arm which can be hooked onto the sliding guide block.

The two guide rails are preferably secured to the front and rear end of the boot floor transversely to the direction of travel of the motor vehicle, and extend substantially across the full width of the boot, so that several support panels can be used and a division at any point of the boot is possible. The sliding guide block is preferably arranged in the direction of travel of the motor vehicle in the rear guide rail, since pressure will generally be applied to the rear end to displace the support panel. In that arrangement the boot space is divided in the direction of travel and lateral securing of the cargo is achieved by the Creation of an additional displaceable side wall.

One possibility of fixing the support panel in the case of a roller device formed by toothed wheels consists in one of the two profiled rack members inserted in the guide rails having, opposite the first series of teeth, a second series of teeth in which the toothed wheel can be locked in place by means of an eccentric lever. Since the two toothed wheels engage in different series of teeth lying opposite one another, they lock mutually, so that it is no longer possible to displace the support panel.

Locking the one toothed wheel into place in the second series of teeth can be achieved in that the eccentric lever is pivotally arranged on the sliding guide block and has a bearing bore for the toothed wheel axle that is eccentric with respect to the pivoting axis of the eccentric lever.

The profiled rack member inserted in the guide rails can be a channel section stamped from sheet metal. So that the sliding guide block can be displaced in this profiled rack member, the sliding guide block has a cross-section fitting into the profiled rack member.

Finally, the support panels can be provided on their wide sides with connecting elements, preferably grooves for the attachment of additional fixing means. The fixing means can be, for example, tensioning ropes for securing the loaded cargo to the support panel, or belt modules, which can be non-positively connected to the connecting elements of the support panels and which are connected to one another by way of roll-up belt. By means of such belt modules having a roll-up mechanism, the lengthwise division of the boot can additionally be provided with transverse divisions. The belt modules can also be used to fix the cargo to a support panel lying flat.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
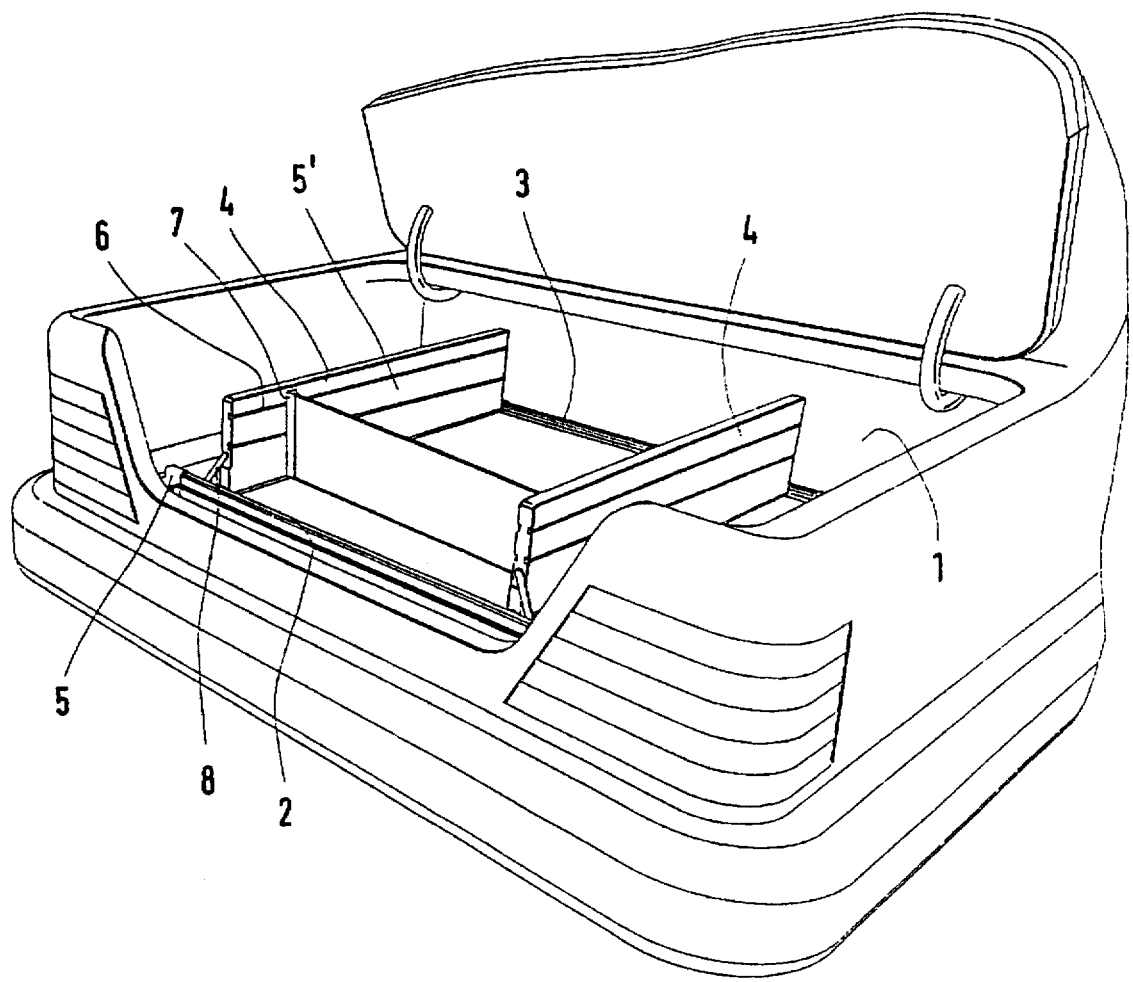
FIG. 1 shows, in a perspective view, the device in accordance with the present invention built into the motor vehicle boot.

FIG. 1 shows a device installed in a motor vehicle boot 1 for variable division of the boot and securing the cargo. The device consists of two guide rails 2, 3 secured to the boot floor at a distance apart, between which the support panels 4 are arranged. The two guide rails 2, 3 are detachably secured to the boot floor transversely to the direction of travel of the vehicle by fixing elements 5. The upright support panels 4 consequently provide a division of the boot into several smaller sections adapted to the particular cargo.

On their wide sides 5', the support panels 4 are provided with connecting elements 6 in the form of grooves, to which various additional fixing devices can be attached, for example, tensioning ropes for securing the cargo to the support panel, or belt modules 7 with a roll-up mechanism for clamping or further division. In combination with such additional fixing devices, the support panels 4 can be used both in the lying position and in the upright position for retaining and holding the cargo. The upright position of the support panels 4 is supported by a locking arm 8.

Figure 2:
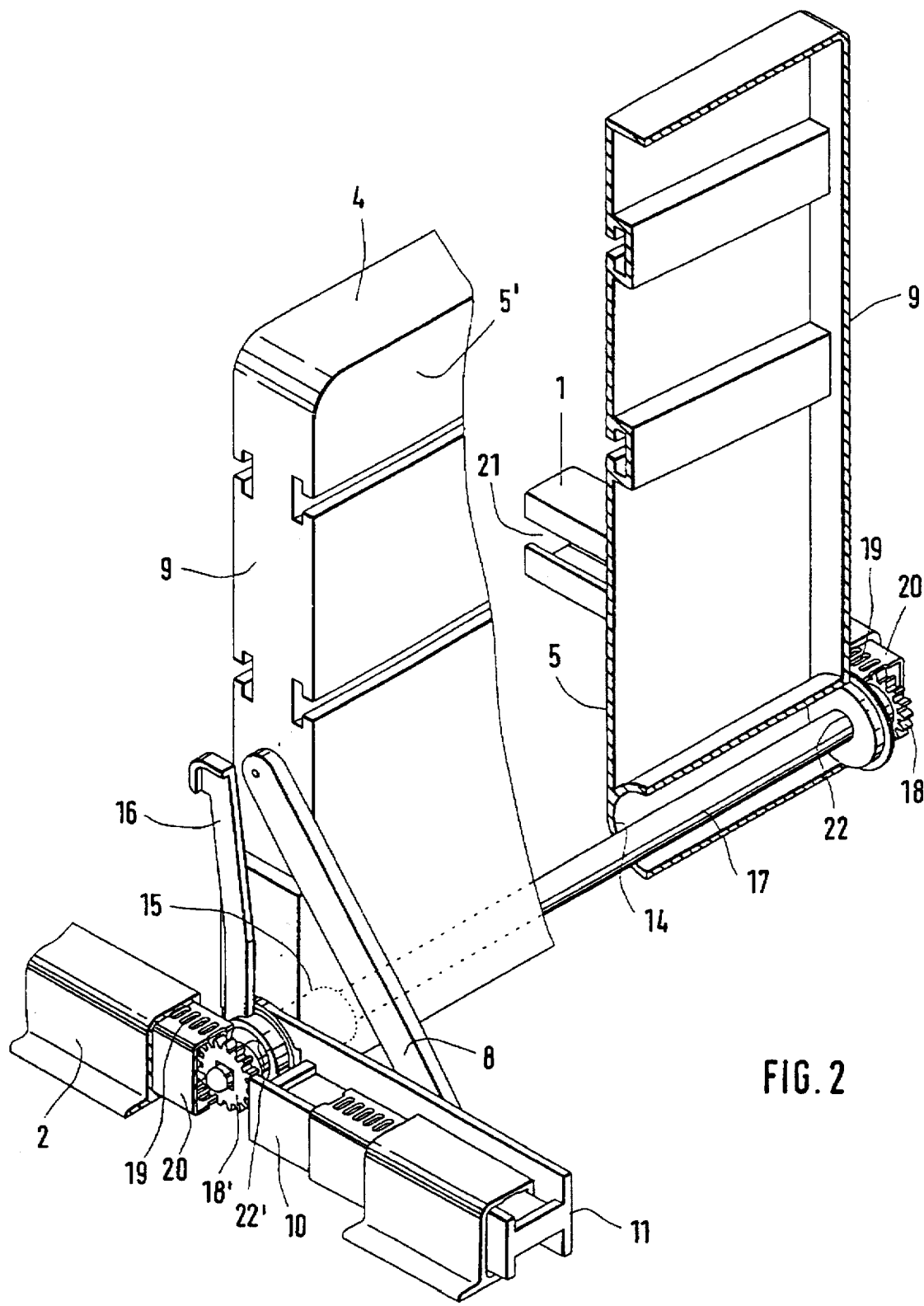
FIG. 2 is a detail fragmentary view of the device in accordance with the present invention with a lockable rolling device.

FIG. 2 shows the support panel 4 in a vertical position which is supported by the locking arm 8 on the sliding guide block 10, the locking arm being mounted pivotally on the end face 9 of the panel. For that purpose, on the outer surface 11 of the sliding guide block 10 there is a peg 12 onto which the forked end 13 of the locking arm 8 is snapped into position (see FIG. 3). The support panel 4 is rotatably coupled to the sliding guide block 10 and can thus be pivoted both into the horizontal and into the illustrated vertical position.

The support panels 4, assembled from, for example, halves comprising the wide sides 5', have a tubular region 14 for receiving the bearing bushes and for reinforcement, in which the bearing bush 15 (shown by a dotted line) of the sliding guide block 10 is inserted.

Mounted in this bearing bush 15 is an eccentric lever 16 which has a bearing bore 22 for the toothed wheel axle 17 that is eccentric with respect to the swivel axis of the lever 16. In the upper position of the eccentric lever 16 illustrated, the bearing bore 22' for the toothed wheel axle 17 of the toothed wheel 18' arranged in the rear guide rail 2 is aligned with the bearing bore 22 of the toothed wheel 18 arranged in the front guide rail 1. Both toothed wheels 18, 18' engage in this position in the upper series of teeth 19 of the profiled rack member 20. In this position of the eccentric lever 16 the support panel 4 can be displaced along the guide rails 1, 2. By means of the toothed wheels 18, 18' joined to one another by the toothed wheel axle 17 so that they rotate together, both toothed wheels roll uniformly and ensure a uniform, non-skewing displacement movement of the support panel 4. This displacement is possible both in a vertical position and in a horizontal position of the support panels.

The profiled rack members 20 fitted along the entire length of the guide rails 1, 2, thus allow a displacement utilizing the entire length of the guide rails. The lateral guidance and stability of the support panel 4 is achieved by the sliding guide block 10 which, by virtue of its cross-section fitting into the internal contour of the profiled rack member 20, is guided in the profiled rack member 20 and consequently in the guide rail. Displacement of the support panel 4 with the sliding guide block 10 and the two toothed wheels 18, 18' located on the toothed wheel axle 17 is enabled by an inwardly facing longitudinal slot 21 in the two guide rails 1 and 2 and the U-shaped profiled rack member 20.

Figure 3:
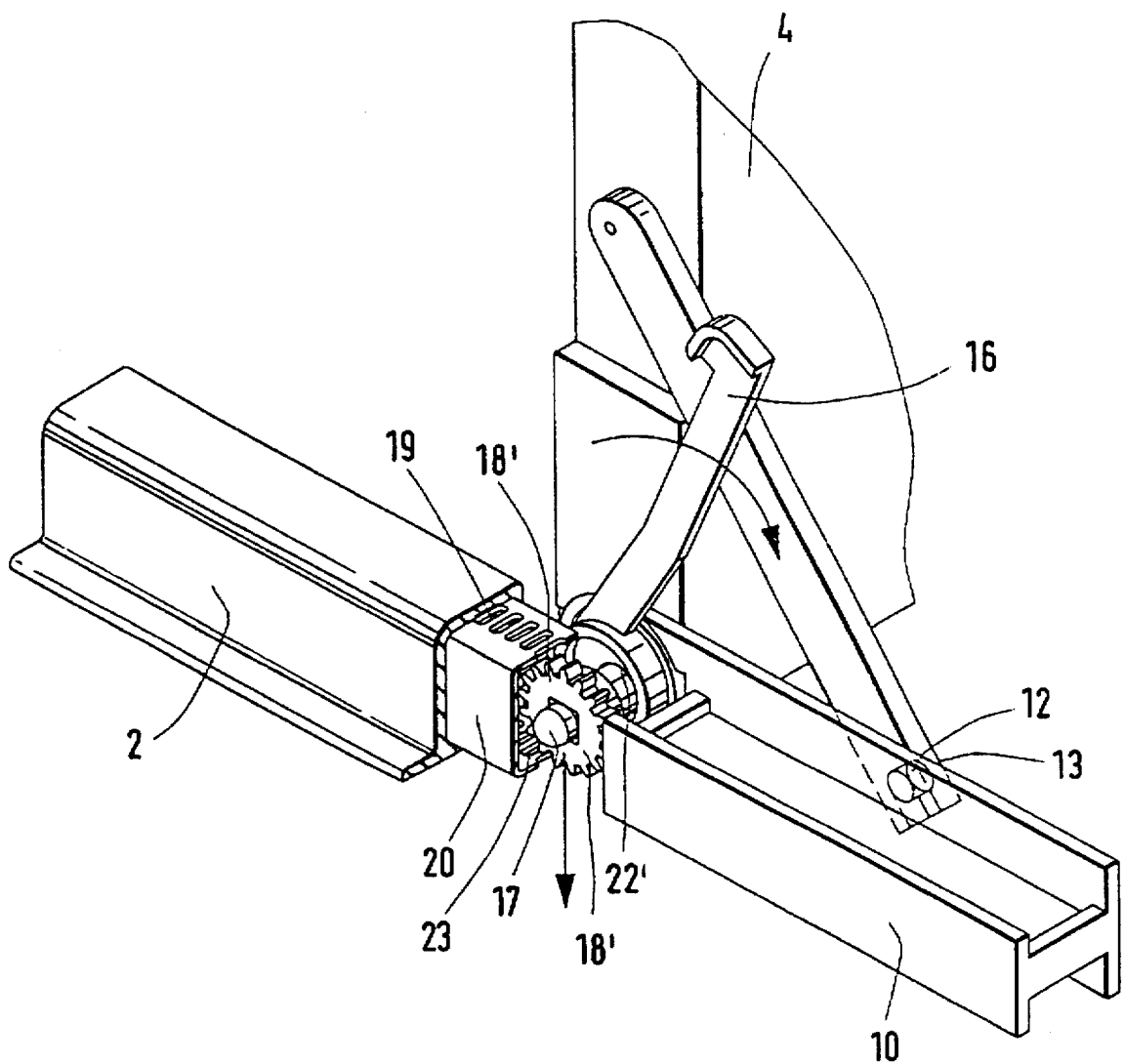
FIG. 3 shows the rolling device during the locking operation.

In FIG. 3, the eccentric lever 16 is being pressed down. The bearing bore 22' for the toothed wheel axle 17 arranged eccentrically with respect to the swivel axis of the lever causes the toothed wheel 18' to disengage from the teeth of the upper series of teeth 19 and to snap into the lower series of teeth 23 of the profiled rack member 20. Since the tooth engagement of the toothed wheel 18 running in the guide rail 1 in the upper series of teeth 19 is maintained, rolling of both toothed wheels through the connection without relative rotation by way of the toothed wheel axle 17, is blocked. The support panel 4 can therefore be fixed in the upright and also in the lying position.

It will be understood that each of the elements described above, or two or more together, may also find a useful application in other types Of constructions differing from the types described above.

While the invention has been illustrated and described as embodied in DEVICE FOR THE VARIABLE DISTRIBUTION OF A MOTOR VEHICLE BOOT AND FOR SECURING THE LOADED CARGO, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A device for a variable division of a motor vehicle boot and for securing a loaded cargo, the device comprising two guide rails arrangeable at a distance apart on a boot floor; at least one supporting panel arranged between said guide rails and displaceable at right angles to said guide rails; rolling devices by which said at least one supporting panel is displaceable to said guide rails and which are arranged in both said guide rails and joined to one another; a sliding block which guides said rolling devices in one of said guide rails, said support panel being rotatably mounted on said sliding guide block and being pivotable from a horizontal position lying on the boot floor into a supportable upright position.

2. A device as defined in claim 1; and further comprising a profiled rack member inserted in each of said guide rails and having a series of teeth, said rolling devices being formed by two toothed wheels which engage in said series of teeth of a respective one of said profiled rack members; and further comprising means for joining said toothed wheels with one another and including an axle which joins said toothed wheels so that they rotate together.

3. A device as defined in claim 2, wherein one of said profiled rack members being provided, in addition to said series of teeth, with a second series of teeth located opposite to said first-mentioned series of teeth, one of said toothed wheels being lockable in said second series of teeth; and further comprising an eccentric lever for locking said toothed wheel in said second series of teeth in place, said locking means including an eccentric lever.

4. A device as defined in claim 3, wherein said guide rails include a front guide rail and a rear guide rail, said at least one profiled rack member being used in said rear guide rail.

5. A device as defined in claim 3, wherein said eccentric lever is pivotally arranged on said sliding guide block and is provided with a bearing bore for said axle, said lever being pivotable about a pivoting axis, said bearing bore being eccentric with respect to said pivoting axis.

6. A device as defined in claim 1; and further comprising a locking arm which supports said support panel in said upright position.

7. A device as defined in claim 2, wherein said profiled rack member has a channel section stamped from sheet metal, said sliding guide block having a cross section fitting into said profiled rack member.

8. A device as defined in claim 1, wherein said support panel has wide sides and is provided on said wide sides with connecting elements for attaching additional fixing means.

9. A device as defined in claim 8, wherein said connecting elements are formed as grooves.

* * * * *